US010628562B2

(12) United States Patent
Wichmann et al.

(10) Patent No.: US 10,628,562 B2
(45) Date of Patent: Apr. 21, 2020

(54) METHOD FOR PROTECTING A COMPUTER PROGRAM FROM BEING INFLUENCED, AND COMPUTER SYSTEM

(71) Applicant: WIBU-SYSTEMS AG, Karlsruhe (DE)

(72) Inventors: Peer Wichmann, Bruchsal (DE); Oliver Winzenried, Karlsruhe (DE); Ruediger Kuegler, Baden-Baden (DE)

(73) Assignee: WIBU-Systems AG, Karlsruhe (DE)

( * ) Notice: Subject to any disclaimer, the term of this patent is extended or adjusted under 35 U.S.C. 154(b) by 0 days.

(21) Appl. No.: 15/121,770

(22) PCT Filed: Feb. 24, 2015

(86) PCT No.: PCT/EP2015/053773
§ 371 (c)(1),
(2) Date: Aug. 25, 2016

(87) PCT Pub. No.: WO2015/128301
PCT Pub. Date: Sep. 3, 2015

(65) Prior Publication Data
US 2017/0068804 A1     Mar. 9, 2017

(30) Foreign Application Priority Data

Feb. 28, 2014   (EP) .................................. 14157177
Aug. 13, 2014   (EP) .................................. 14180795

(51) Int. Cl.
*G06F 11/30*     (2006.01)
*G06F 12/14*     (2006.01)
(Continued)

(52) U.S. Cl.
CPC .......... *G06F 21/125* (2013.01); *G06F 21/123* (2013.01); *G06F 21/14* (2013.01); *G06F 21/602* (2013.01); *G06F 21/72* (2013.01)

(58) Field of Classification Search
CPC ...... G06F 21/125; G06F 21/123; G06F 21/14; G06F 21/602; G06F 21/72
See application file for complete search history.

(56) References Cited

U.S. PATENT DOCUMENTS 7,287,166 B1 * 10/2007 Chang .................... G06F 21/54
                                                713/176
8,356,186 B1 *  1/2013 Bean ..................... H04L 9/0894
                                                713/189
(Continued)

FOREIGN PATENT DOCUMENTS

| DE | 102011085948 A1 | 4/2013 |
| EP | 2249278 A1 | 11/2010 |
| WO | 99/01815 A1 | 1/1999 |

OTHER PUBLICATIONS

International Search Report and English Translation and Written Opinion of the International Searching Authority received in Patent Cooperation Treaty Application No. PCT/EP2015/053773, dated May 13, 2015, 13 pages.
(Continued)

*Primary Examiner* — John B King
*Assistant Examiner* — Darshan I Dhruv
(74) *Attorney, Agent, or Firm* — Hubbard Johnston, PLLC

(57) ABSTRACT

The invention relates to a method for protecting a computer program from being influenced by an invasive program or by manipulation software for manipulating computer programs on a computer system comprising a processor, a main storage unit, and a storage medium. The method involves the Kerckhoffs's principle such that the protected computer program is freely accessible and can be read by an invasive program or manipulation software. Parts of the protected computer program are provided multiple times in the program code of the protected computer program as a result of (Continued)

the specialization of the computer program. Parts of the computer program are encrypted in order to prevent a statistical analysis of the computer program without the processor running the computer program, wherein a key which is required to decrypt the encrypted parts of the computer program is stored in a protected key storage unit which communicates with the computer.

35 Claims, 10 Drawing Sheets

(51) Int. Cl.
*G06F 21/12* (2013.01)
*G06F 21/14* (2013.01)
*G06F 21/60* (2013.01)
*G06F 21/72* (2013.01)

(56) References Cited

U.S. PATENT DOCUMENTS

| | | | | |
|---|---|---|---|---|
| 8,954,752 B2* | 2/2015 | Boivie | | G06F 21/6209 380/201 |
| 2002/0083318 A1* | 6/2002 | Larose | | G06F 21/10 713/164 |
| 2002/0120854 A1* | 8/2002 | LeVine | | G06F 21/10 713/189 |
| 2003/0120938 A1* | 6/2003 | Mullor | | G06F 21/14 713/190 |
| 2003/0236986 A1* | 12/2003 | Cronce | | G06F 21/14 713/189 |
| 2005/0183072 A1* | 8/2005 | Horning | | G06F 21/14 717/140 |
| 2006/0031686 A1* | 2/2006 | Atallah | | G06F 12/1408 713/190 |
| 2006/0218539 A1* | 9/2006 | Stiemens | | G06F 21/125 717/140 |
| 2007/0256061 A1* | 11/2007 | Victorov | | G06F 21/125 717/141 |
| 2008/0208560 A1* | 8/2008 | Johnson | | G06F 21/14 703/22 |
| 2009/0083521 A1* | 3/2009 | Sato | | G06F 21/14 712/220 |
| 2009/0276857 A1* | 11/2009 | Harkness | | G06F 21/14 726/26 |
| 2009/0307500 A1* | 12/2009 | Sato | | G06F 21/14 713/190 |
| 2010/0017879 A1* | 1/2010 | Kuegler | | G06F 21/123 726/23 |
| 2010/0146304 A1* | 6/2010 | Miyatake | | G06F 21/14 713/194 |
| 2010/0191959 A1* | 7/2010 | Czajkowski | | G06F 21/14 713/155 |
| 2010/0199354 A1* | 8/2010 | Eker | | G06F 21/14 726/26 |
| 2011/0035601 A1* | 2/2011 | Davidson | | G06F 21/14 713/190 |
| 2011/0307961 A1* | 12/2011 | de Perthuis | | G06F 9/30145 726/26 |
| 2012/0204038 A1* | 8/2012 | Farrugia | | G06F 21/14 713/190 |
| 2012/0311546 A1* | 12/2012 | Fanning | | G06F 8/49 717/136 |
| 2013/0054650 A1* | 2/2013 | O'Byrne | | G06F 21/6254 707/793 |
| 2013/0232343 A1 | 9/2013 | Horning et al. | | |
| 2013/0232578 A1* | 9/2013 | Chevallier-Mames | | G06F 21/10 726/26 |
| 2013/0283396 A1* | 10/2013 | Langer | | G06F 21/121 726/28 |
| 2013/0332746 A1* | 12/2013 | Monsifrot | | G06F 21/75 713/190 |
| 2014/0082354 A1* | 3/2014 | Smith | | G06F 21/6218 713/165 |
| 2014/0165030 A1* | 6/2014 | Chevallier-Mames | | G06F 21/14 717/110 |
| 2014/0215225 A1* | 7/2014 | Koliesnik | | G06F 21/14 713/190 |
| 2014/0245271 A1* | 8/2014 | Miller | | G06F 8/423 717/146 |
| 2015/0067874 A1* | 3/2015 | Johnson | | G06F 21/14 726/26 |
| 2015/0074392 A1* | 3/2015 | Boivie | | G06F 21/602 713/164 |
| 2015/0121536 A1* | 4/2015 | Xing | | G06F 21/12 726/26 |

OTHER PUBLICATIONS

European Search Report received in European Application No. 14180795.8, dated Nov. 14, 2014, 3 pages.
Wikipedia, "Kerckhoff's Principle," https://en.wikipedia.org/wiki/Kerckhoffs%27s_principle, Jan. 23, 2014, 5 pages.
Machine Translation of German Application No. 102011085948 A1 published on Apr. 18, 2013, 8 pages.

* cited by examiner

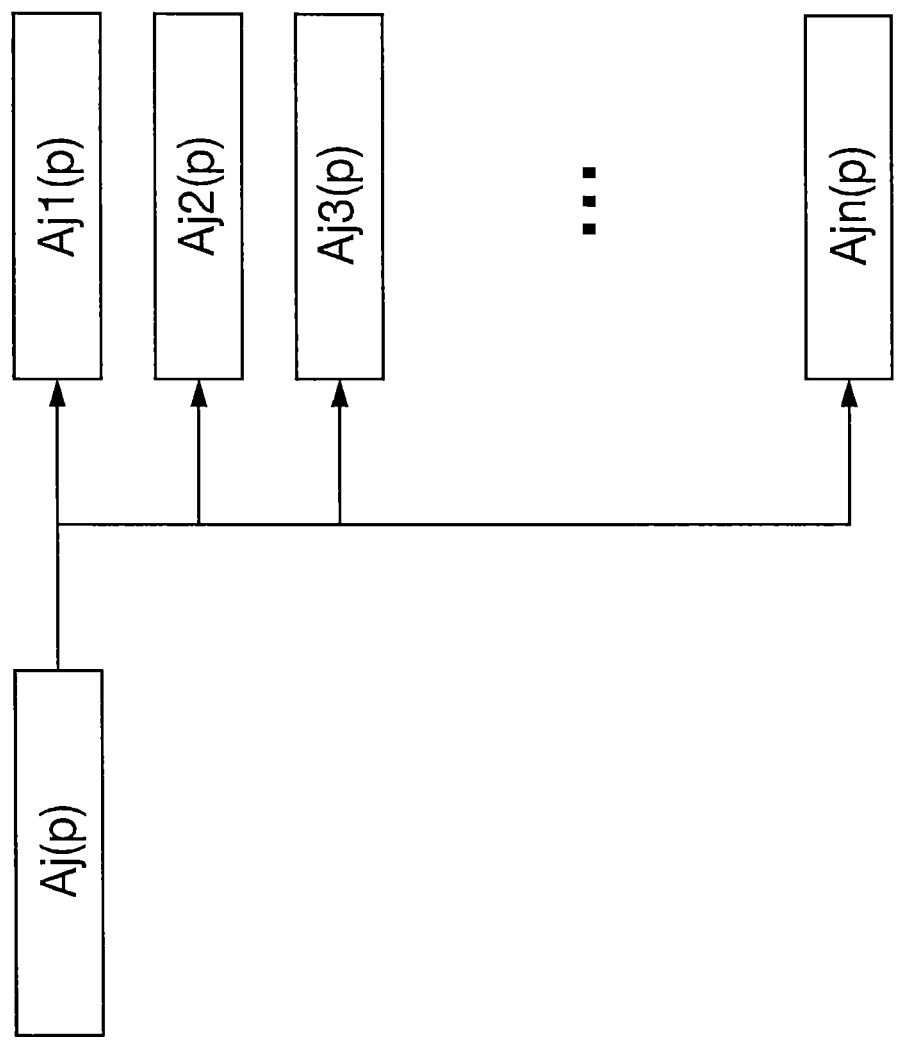

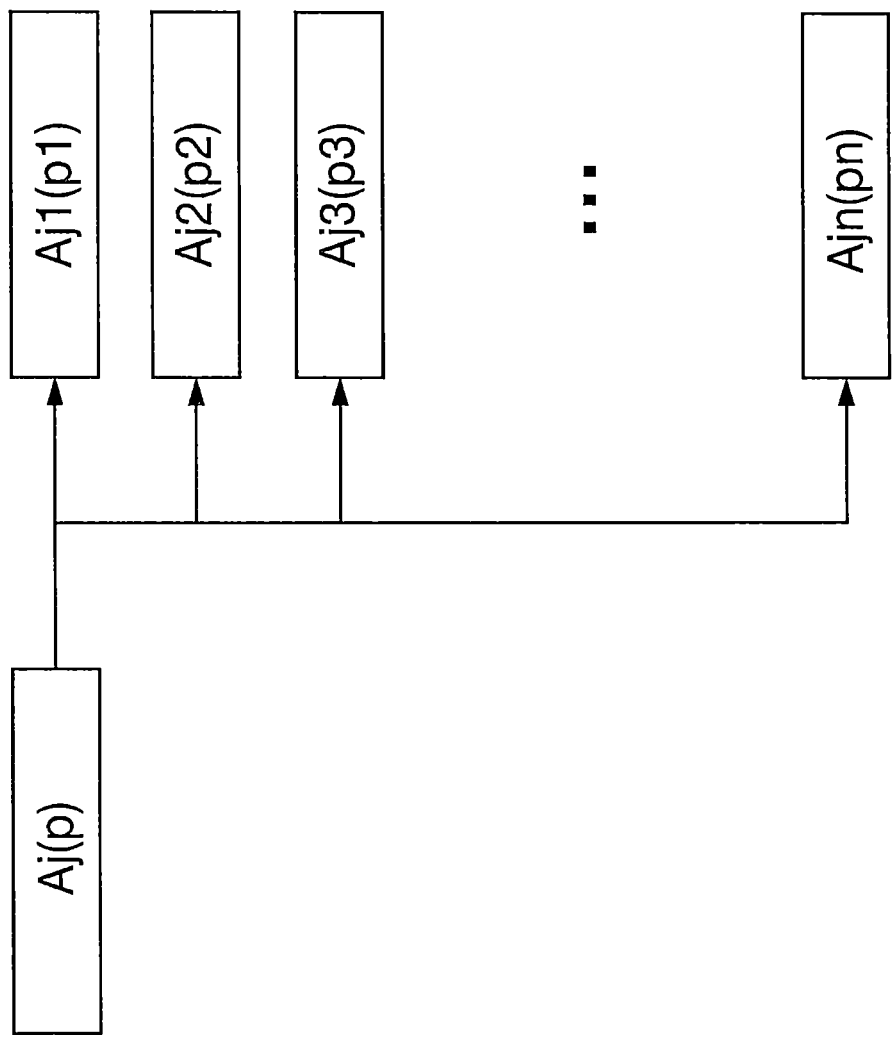

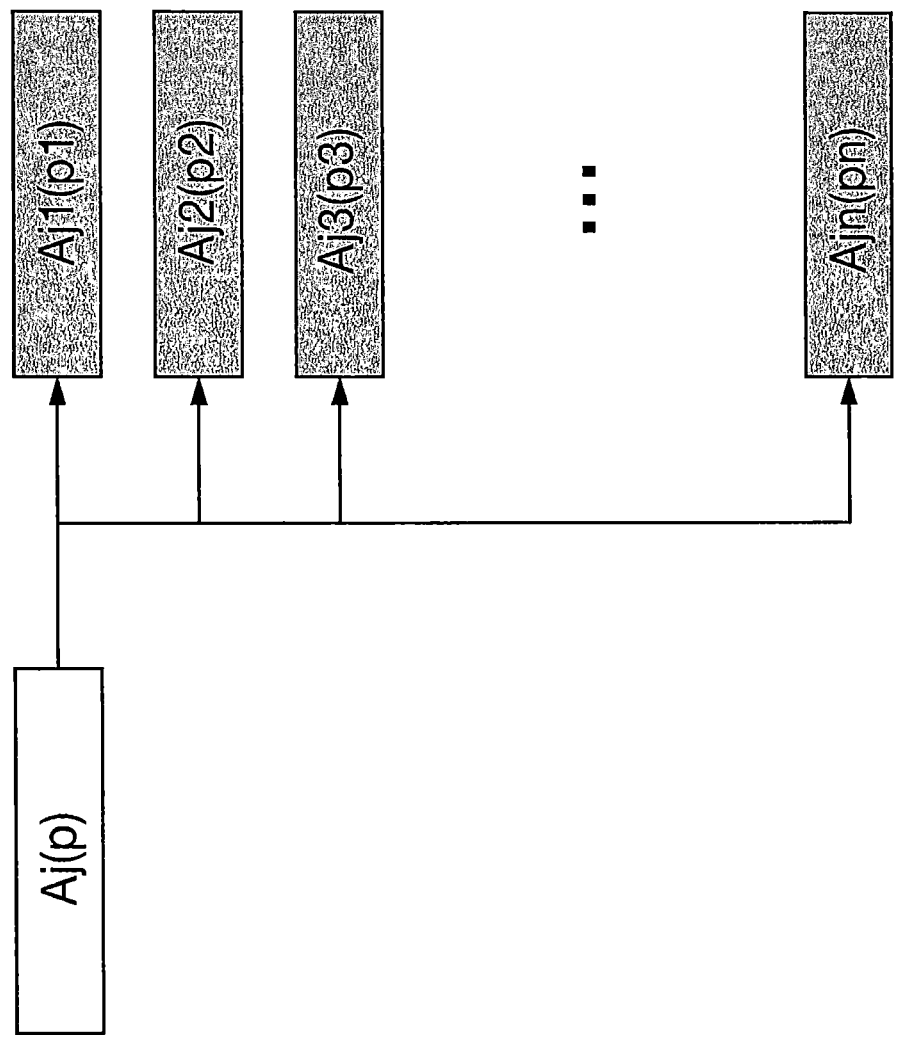

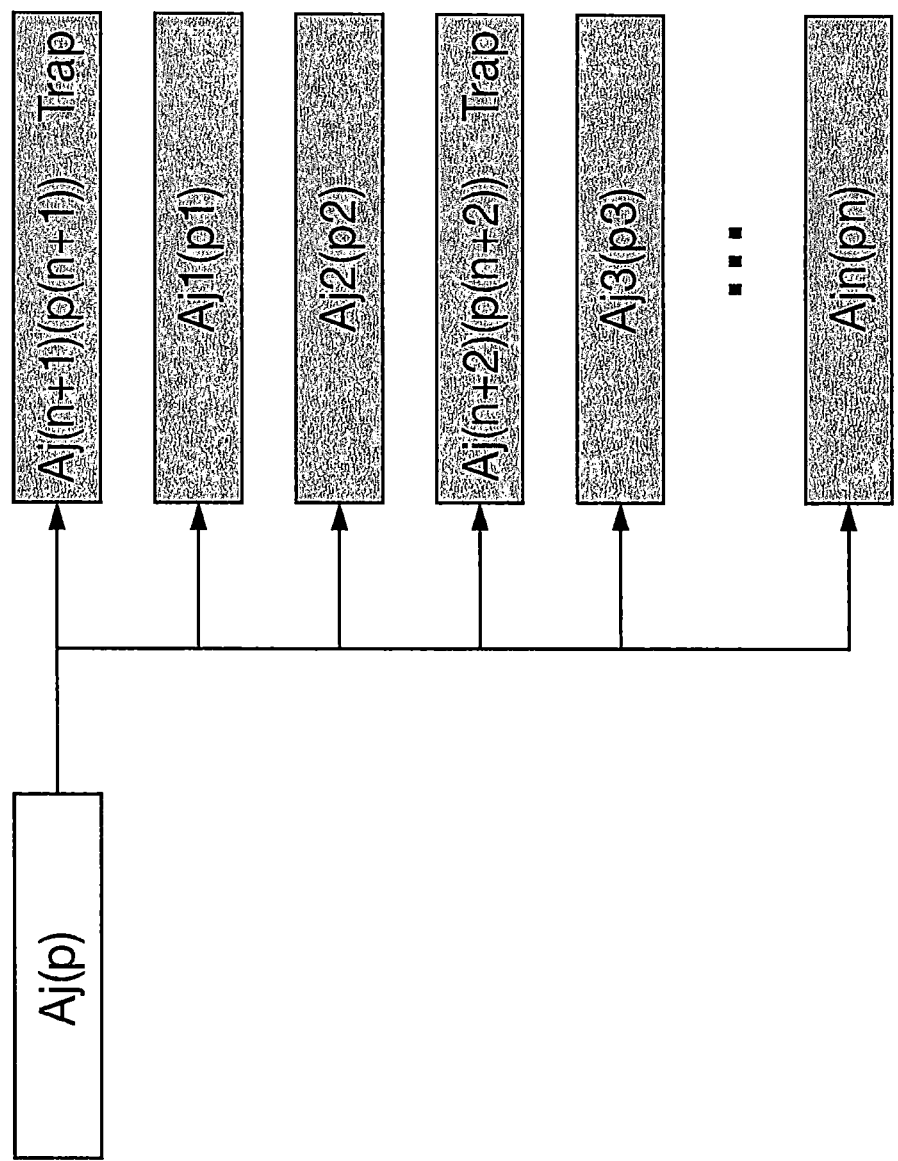

us 10,628,562 B2

METHOD FOR PROTECTING A COMPUTER PROGRAM FROM BEING INFLUENCED, AND COMPUTER SYSTEM

RELATED APPLICATION

This application, a national phase application of PCT/EP2015/053773, filed Feb. 24, 2015, which claims priority to European Application No. 14180795.8 filed Aug. 13, 2014 and European Application No. 14157177.8 filed Feb. 28, 2014.

The present invention pertains to a method for protecting a computer program from being influenced by an invasive program or by manipulation software for manipulating computer programs on a computer system. The computer system typically comprises one or more processors, a main memory for processing the program and a storage medium.

Software protection mechanisms are used for preventing unauthorized copying and analyzing of intellectual property (reverse engineering). Depending on the type and value of the software, a dongle, a computer-bound license or a license on a license server is used in this case. The license server can be operated in the cloud by the user or by the software manufacture and in turn also uses a dongle or a computer-bound license.

A hacker attempts to bypass the software protection in order to use the software or its intellectual property personally or to sell a pirated copy thereof to an unauthorized user. This user is frequently unaware of the fact that he has purchased a pirated copy.

The methods used by hackers can be distinguished between dynamic and static analyses. In a dynamic analysis, the hacker executes the software in a debugger and observes and changes the software; alternatively, the hacker intercepts data at the interface with the software protection and stores the communication for a playback-hack. In a static analysis, the hacker reconverts the software into readable code by means of a disassembler or manually decrypts encrypted parts. The reconversion into a high level language (C#, Java, VB) is frequently possible without any difficulty, particularly in modern programming languages such as .NET and Java. In native Windows, Linux or OS-X programming, the code is converted into assembler instructions. Software protection methods such as API-calls or obfuscation by changing names can be easily bypassed by a hacker. Modern software protection methods utilize cryptography for encrypting executable code and data, as well as for challenge-response inquiries. The secret keys used for this purpose are stored in a dongle.

Secure protection in terms of the prior art can be achieved by utilizing encryption if it is assumed that the hacker is not in possession of a dongle with the corresponding keys.

In practical applications, however, this assumption is incorrect. Although the dongle cannot be simulated or copied by a hacker (black-box), the software is sold together with the dongle. In contrast to message encryption, the user has a key, but no interest in keeping this key secret. The key is automatically used by the software. In currently used software protection methods, information on the use of the key in the software would theoretically allow an automatic reconversion into unprotected code. This applies, in particular, if the hacker is familiar with the protection system after an initial detailed analysis. As a general rule, it also has to be assumed that a hacker is in possession of a personal version of the protection system (white-box).

The present invention is based on the objective of proposing a method that also provides sufficient protection against influencing and analyzing a computer program to be protected if a hacker is familiar with the protection method.

The above-defined objective is attained by means of a method with the characteristics of claim 1, as well as a method with the characteristics of claim 2, and by means of a computer system according to claim 17.

In the context of the invention, it was recognized that it is impossible to permanently protect a computer program or a method by keeping it secret. Typically used methods for protecting a computer program comprise the encryption of parts of the computer program and a corresponding runtime decryption, a debugger detection and, in progressive methods such as, for example, the method of the firm WIBU-SYSTEMS AG, the additional locking of a dongle.

It was furthermore recognized that previous methods contradict the so-called Kerckhoff principle and that a method based on the Kerckhoff principle also provides very sound and reliable protection if the method itself is known and a key is available in order to allow an authorized execution of the computer program. According to the Kerckhoff principle, which forms the basis of the inventive method, the security of a method or a computer program does not depend on keeping the method or the computer program itself secret, but rather the key or the keys used. This takes into account the fact that a hacker will sooner or later come into possession of the system, i.e. the protected program, and be able to analyze this system in detail. It is also irrelevant for the system if a key for decrypting the computer program exists because the security only depends on the key used and not on keeping the system or the computer program secret. Consequently, even an internal hacker, who may have personally created the system or the computer program, has no better chances for success than an external hacker using an invasive program or manipulation software in order to manipulate the protected computer program.

This also means that information on the protection method for protecting a computer program, for example information of a developer, likewise does not provide any appreciable advantages. Even the availability of "instructions for breaking the software" provides no advantages for a hacker. The hacker must continue to put considerable effort into respectively breaking each individual instance of the computer program or each individual module of the computer program.

According to the invention, at least parts of the computer program are encrypted in order to prevent a static analysis of the computer program without execution of the program by a processor. A key required for decrypting the encrypted part of the computer program is stored in a secure key storage unit, i.e. a protected or encrypted key storage unit, that communicates with the computer. It is also possible to use multiple keys. In contrast to the prior art, in which the keys used are concealed in the program, a separation of program and keys is realized in the present method.

According to the invention, the method for protecting a computer program is based on the Kerckhoff principle. Consequently, the protected computer program and all parts of the protected computer program, namely also the encrypted parts, are freely and publicly accessible and therefore laid open. The program parts and the program structure are not kept secret. Manipulation software or an invasive program can read out the protected program.

The structure of the protected computer program is changed in comparison with the unprotected computer program in such a manner that parts of the computer program are provided multiple times. The parts of a program, which are implemented multiple times in the protected computer program, are chosen based on the inherent complexity ("Fachlichkeit") of the program, i.e. with information on the program sequence, as well as on the purpose and the use of the computer program to be protected. Consequently, the parts of the program, which are provided multiple times or at least twice, are chosen based on the results in the program execution or in dependence on processed input values.

This procedure represents a problem for a hacker. It was recognized that a hacker knows exactly how software is "cracked." In this case, the hacker removes inquiries in the protected computer program, changes return values and locates and (if possible) decrypts encrypted code. Memory dumps are executed and program code is patched.

However, a hacker does not know how the computer program is used. The hacker has no information on the use and the results. Consequently, the hacker cannot check and evaluate whether a result or an output value is correct or incorrect. The hacker also cannot decide if input values and processed values within the program are sensible or which input values are sensible at certain points of the program. No decisions regarding the so-called inherent complexity of the computer program can therefore be made by the hacker. However, information on this inherent complexity of the computer program is one particular prerequisite in the inventive method.

In the context of the invention, it was also recognized that the method for protecting a computer program has to be based on the lack of in-depth knowledge on the part of a hacker and an invasive program or manipulation software. The inherent complexity therefore is a crucial aspect. The protection methods are based on and utilize the complexity of the computer program and of the method for its protection. The function of the method for protecting the computer program and the function of the computer program protected by the method therefore can no longer be separated and only reproduced with great difficulty. This also applies if the protected computer program is freely accessible and known.

In a preferred embodiment, the key storage unit, which has restricted access or is encrypted or protected and therefore secure, is realized in the form of a dongle, i.e. an independent external device such as a token, a USB stick or a memory card that can be connected to the computer system, on which the protected computer program is executed, via a corresponding interface. Alternatively, the dongle not only may consist of hardware that is specially provided for protection purposes, but also of a standard token that is addressed, for example, by means of PKCS #11. Although such a token can only fulfill limited functions, it can likewise be used as a secure key storage unit. Alternatively, this secure (and protected, e.g. encrypted) key storage unit may consist of the storage medium of the computer, on which the computer program is executed; it may particularly consist of a protected area of the storage medium of the computer.

According to the invention, the inventive method for protecting a computer program, which is also referred to as Blurry-Box method, comprises the following steps:

The computer program to be protected is initially divided into individual modules. In a preferred embodiment, these modules may comprise one or more function blocks. In this respect, a function block refers to a functional unit of the computer program that yields a (certain) predefined, self-contained function. It may consist, for example, of a block that provides a characteristic for controlling a process in an application or of a filter used for image processing purposes such as a contrast enhancement. The function block therefore is a logical unit within the computer program that yields certain functions. A module may comprise one or multiple function blocks, but also different software code.

According to the method, at least part of the computer program and at least one of the modules of the computer program are encrypted. The function block is therefore encrypted in the simplest case. At least one key required for decrypting the computer program and its parts is stored in a protected key storage unit. Such a key storage unit may consist of a hardware dongle or be implemented in the form of software, for example in the storage medium of the computer system.

In another step, a specific state value for the computer program is generated or identified in case it has already been generated. In the context of this application, the state value is characteristic for the process being executed in the computer system. It describes the process or its (instantaneous) state, wherein the term process refers to a computer program that is loaded into the main memory and currently executed. The state value is an internal logical value or state of the program and based on the inherent complexity of the program, i.e. on the program content. The state value is not a physical representation in the computer or the main memory of the computer and therefore not a value used outside the program such as, e.g., a floating-point number in the main memory. In fact, the state value is an internal value specific to the program execution and may represent, e.g., a ground or floor hardness, in which case it assumes the value of granite, clay, wood, carpet, etc., or the combustion pressure in an engine such as, e.g., a pressure between 0 and 200 bar, between 200 and 500 bar, between 500 and 1200 bar or in excess of 1200 bar.

However, the state value may also comprise a parameter, a global variable, a call sequence of functions or function blocks or the call hierarchy of functions within the computer program. The state values are visible in the stack or other parts of the memory of the computer system and usually can be read out. This state value is processed in a module loaded into the main memory while the computer program is executed by the processor in the main memory of the computer system, on which the computer program is loaded. The state value therefore is handed over to the module in the form of an input parameter and is required for its execution.

In another step, the inventive automated method checks if the processed state value is valid for the module. In this case, it may be checked if the state value has a predefined and expected value, lies in a predefined value range, is an expected variable or consists of another specific call parameter for the invoked module. The program sequence of the computer program is changed if it is determined that a state value is invalid. This can lead to a program termination or the triggering of an alarm. The program termination may take place immediately or with a certain time delay such that a hacker does not know which module call or which module has triggered the termination. The time delay may be defined in the form of a certain time period, randomly or in dependence on a certain number of additional calls, e.g. module calls, e.g. 3, 5 or 10 calls. The change in the program sequence may also consist of a silent alarm that is transmitted in the form of a message, for example, to an external server computer or a desired web address or e-mail address.

In a preferred embodiment of the method, the computer program to be protected is initially divided into modules. At least one of the modules A is duplicated such that two identical modules A1 and A2 are created. The modules are preferably modified in an additional step. During this process, a respective value range $\alpha1$, $\alpha2$ is defined for each module A1, A2. The value range applies to at least one input parameter a1, a2 required for the execution of the module.

In the next step, the modules A1, A2 are preferably encrypted. According to the preferred embodiment of the inventive protection method, the call of a module with at least one parameter a1, a2 is now diverted to the key storage unit. The key storage unit, which preferably consists of a dongle, receives the input parameter a1, a2 transmitted due to the module call. The input parameter a1, a2 is checked against the value range $\alpha 1$, $\alpha 2$ defined for the invoked module A1, A2 in the key storage unit. It is then decided if the module call is authorized in the key storage unit. Consequently, it is verified if suitable input parameters for the module call are present and if the module call is valid. If such authorization is verified, a selection parameter i is returned to the invoking part of the program. The selection parameter i serves for selecting the i-th module Ai.

A hacker attempts to select the correct module or the correct module variant (A1, A2) without using the key storage unit. This can only be achieved with the trial and error approach. In order to prevent multiple trial and error attempts by a hacker or to reduce the number of attempts to determine the valid input parameter for the respective module, the program sequence can be changed such that an alarm is triggered or the program is locked if an input error is detected. This may take place immediately or with a certain time delay. Alternatively, the key storage unit can also be locked.

The bar is raised even higher for a hacker if the modules or function blocks are encrypted because the hacker only sees the encrypted part of the program, but can not deduce its content. If the program is highly complex and comprises a plurality of modules, a variation without encryption of the respective modules would also provide sufficient protection.

If the modules are encrypted, the input parameter a1, a2 is handed over to the dongle together with the instruction to decrypt the selected module Ai after the selection parameter i has been returned to the invoking program part in the protected program. The key storage unit, e.g. a dongle, decrypts and executes the module if the module and the input parameter match. A result value of the module is returned and can be further processed.

It was determined that the inventive method for protecting a computer program makes it possible to provide robust protection against static attacks, as well as dynamic attacks, by manipulation software. With respect to software protection, one generally distinguishes between static and dynamic attacks. Both types of attacks attempt to reconstruct the computer program such that it can also be executed without authorization provided by the computer program manufacturer in the form of one or more cryptographic keys or a corresponding license stored, for example, in a key storage unit.

The inventive method even provides protection under the following assumptions:
- The hacker is in possession of at least one license for the software. The hacker is able to acquire additional licenses, for example, by purchase. The number of all licenses is limited by a parameter k that may ultimately be defined by the manufacturer of the computer program.
- A hacker has access to the supplied code. The hacker is familiar with the computer program and the method used for protecting the computer program. The hacker particularly knows that the computer program is divided into modules or function blocks.
- A hacker has access to the interfaces provided by a key storage unit as long as the license of the hacker is valid. The key storage unit typically consists of a dongle, i.e. a piece of hardware or a device that is connected to an interface of the computer system.
- It is assumed that the keys stored in the key storage unit cannot be extracted. When using a dongle, the keys stored on the dongle can in fact be used, but they cannot be separated from the dongle and copied.
- However, the method for protecting a computer program requires that no detailed information on the actual functionality of the computer program is available.

In a static attack scenario, the hacker pursues a hacking strategy that is independent of the computer program. The hacker is familiar with the computer program to the extent that the hacker sees the individual blocks. The hacker also has access to the program code of the computer program and the encrypted parts. The hacker can send decryption inquiries for the individual function blocks to the key storage unit. Very secure protection against this type of attack can be ensured because the probability of the hacker guessing the correct sequence of function blocks, which ultimately depends on the aforementioned parameter k, is very low. An attack will therefore fail. A so-called proof of reduction makes it possible to demonstrate that the hacker cannot gain any additional information from the decryption inquiries and the information on the encrypted computer program divided into blocks. The proof of reduction refers to the security of the encryption method used for protecting the computer program.

A dynamic attack scenario is based on the assumption that the program is executed. In this case, it is anticipated that certain trivial attacks cannot be prevented. Attacks of this type can be divided into two categories:

Category 1: logging inputs and outputs of the computer program
If a hacker executes the program, the hacker gains information on the output generated by the computer program as a result of the hacker's input. For example, the hacker can send certain parameters to the program and detect the outputs resulting from the execution of the corresponding parts.

Category 2: logging decrypted function blocks or modules
While the computer program is executed, a hacker can log and assemble the function blocks or modules that are stored in the main memory in the form of plain text. In this manner, the hacker gains information on the function blocks associated with a certain input. The hacker also gains information on function blocks that are potentially associated with other inputs. A category 2 attack therefore is stronger than a category 1 attack.

These dynamic attacks of both categories can be sufficiently repeated by a hacker with different inputs. A hacker therefore is ultimately able to reconstruct the complete program. Attacks of both categories can theoretically not be prevented. However, they are very elaborate for computer programs of realistic size such that the required effort is rarely justified.

From a formal point of view, the security of the method for protecting a computer program therefore concerns attacks that go beyond these trivial attacks.

In a special embodiment of the method for protecting a computer program, at least one function block or one module is therefore replaced with a plurality of variants. It is particularly preferred that the variants can be generated after the computer program to be protected has been compiled. In this case, the function block or the module is preferably copied, i.e. duplicated. Multiple identical variants may be provided, but also be modified. The individual variants are preferably responsible for processing different input parameters or state values, wherein said variants only apply to these input parameters or state values and lead to a correct result in the execution. The selection of the variant used in the program sequence preferably depends on the input parameter or state value. The execution of a variant with incorrect parameters can lead to the termination of the program sequence or to the deletion of the keys or individual parts of the computer program.

The variants of the modules or function blocks therefore are preferably generated by means of duplicating, preferably with a modification. In an alternative and likewise preferred embodiment, variants can be generated by means of a structure analysis of the computer program or based on meta-information on the computer program, with which the method for protecting the computer program has to be familiar. The meta-information is based on the inherent complexity of the computer program and depends on the type and use of the program. The variants of the individual function blocks may be altogether functionally identical to the original function block or only for subranges of the possible inputs. If a characteristic is stored and executed in a function block, for example, it would be conceivable that these characteristics are divided into different value ranges and the variants of the function blocks cover a certain range of the characteristic. In this case, the variants may be realized in such a manner that the corresponding value range, to which the variant should be applied, is identical to the original function block, but the characteristic differs outside the specific value range such that a call of the variant of the function block outside the specific value range leads to an incorrect return result. In an engine control, for example, it would be conceivable to store different characteristics in individual variants, e.g., for a warm-up phase, a normal operating mode of the engine and a racing mode, as well as for an emergency mode and an energy-saving mode. If the function block represents an image processing filter, the contrast enhancements for color images and for black-and-white images could comprise different contrast enhancement algorithms such that each variant leads to different results depending on the input parameter (call parameter, state value).

In a preferred embodiment, a variant of a function block or module is selected and executed in dependence on a state value. If the state value is the operating mode of an engine, for example, the respectively correct variant for the state value, i.e. for the operating state of the engine, can be selected in the above-described fashion.

The key storage unit can preferably be used for checking if the state value corresponds to the invoked variant. In the context of the invention, a state value not only refers to a call parameter or a parameter in the program sequence of the computer program, but may also consist, for example, of a global variable. The state value may furthermore also comprise a call sequence or a call hierarchy of individual function blocks, variants or modules. The key storage unit therefore preferably checks if the call or input parameter (state value), by means of which the variant is invoked, matches the variant and is expected by the variant. It is therefore checked if a valid call or input parameter is used for the corresponding variant.

In a preferred embodiment, the variants may be modified in such a manner that a certain value range or subrange for the state value is defined in a variant and the state value must lie within the defined value range when the variant is invoked in order to detect a valid call and to perform an execution. For example, it would be possible to select variant 1 with a call parameter (state value) in the value range between 1 and 10 whereas variant 2 is invoked with a value in the range between 11 and 20 and variant 3 is invoked with a value greater than 20. For example, the check may either be carried out in the processor while the computer program is executed, i.e. during the execution of the process, or with the aid of the key storage unit. It would also be conceivable to use a separate key storage unit or a protected area of the storage medium of the computer system for this purpose.

In a preferred embodiment of the method for protecting a computer program, the selection of the call of a variant takes place based on predefined values.

These values are preferably stored in a table such as, for example, in the key storage unit or in a protected area of the storage medium of the computer system. However, the values can also be determined algorithmically, wherein it is particularly preferred that they are calculated or determined from other state values of the process during the execution thereof. In this respect, it would be possible, for example, to combine which variants or function blocks or modules were previously invoked or if a certain operating mode predominates, for example an operating mode of the engine in an engine control. It is also possible to determine the predefined value for selecting the call of a variant by means of the key storage unit.

The method for protecting a computer program therefore utilizes different options for the variant selection. As a result, externally identical variants of a function block can behave differently depending on whether or not they are used in the specified value range and validity range.

The use of variants also provides the option of storing certain program structures. In certain program structures with cascading conditions (IF-statements or so-called case-statements or switch-statements), for example, different variants can be used for individual inquiries or IF-statements.

In a preferred embodiment, at least one of the variants is encrypted. The key required for the decryption can be stored in the secure key storage unit. In this case, the processor preferably can communicate with the secure key storage unit in order to carry out the decryption. In this respect, it would be conceivable to store different keys for different variants of function blocks in the key storage unit. However, certain variants may also be combined into groups such that only one key, which is likewise stored in the key storage unit, is required for their decryption.

This inventive principle is based on the realization that the shift of application code, i.e. parts of the computer program, into the key storage unit is associated with significant implementation problems. In contrast, it was recognized that the selection of the variants to be used can be calculated in the key storage unit in a relatively simple fashion. Consequently, an attack on the protected computer program in the form of a static analysis no longer makes it possible to determine the variant to be invoked in a specific instance without directly executing the code. A hacker even encounters problems during a dynamic analysis because the hacker's use of the incorrect variant for the corresponding value range may lead to different results after the decryption depending on the call of the variants.

The key storage unit preferably consists of a device such as, e.g., a dongle. If the device selects the variants or carries out additional checks, it preferably comprises a processor. A memory such as, e.g., a data memory may optionally be provided. The processor executes a selection algorithm in order to carry out the module selection based on input parameters. A result in the form of an index or parameter may be returned.

In a preferred embodiment, all variants are encrypted, wherein the required keys are stored in the key storage unit such that only the key storage unit can decrypt a variant of a function block.

In another preferred embodiment of the method, other function blocks are generated in addition to the variants, but not invoked during a concrete execution of the program. An attack by means of an invasive program or manipulation software is detected if the key storage unit receives the instruction of decrypt such a function block that serves as a trap.

According to a preferred embodiment of the method, the computer program also comprises modules, function blocks or variants that are never executed during the (proper) process. Their call or their execution leads to the process termination, locking of the key storage unit and/or deletion of the key storage unit. A dynamic analysis of the program to be protected is thereby also prevented. During a dynamic analysis, the invasive program observes the computer program to be executed and to be protected during its execution. So-called debuggers are normally used for this purpose. Since the computer program to be protected is executed, it can also interact with the environment and, in particular, with hackers and their malware or manipulation software. For example, corresponding countermeasures of the above-described type such as locking or deleting the key storage unit can be initiated if the method detects that the computer program is influenced or manipulated.

In a preferred embodiment, the method detects an intrusion attempt or a manipulation by means of manipulation software. This can be realized, for example, by springing a trap during a dynamic analysis, i.e. by invoking a function block that is never invoked by the computer program or only invoked at a different time or from a different address. An alarm can be triggered, for example, by sending an alarm message to a remote computer in case an intrusion attempt is detected. Alternatively, the key storage unit can be manipulated and the process can be terminated.

In a preferred embodiment, the state value processed in a module during the execution of the computer program by the processor in the main memory is a value that refers to the process state of the computer program. In this case, it is checked if the state value lies within a valid, predefined validity range. The validity range is preferably stored in the variant, particularly in encrypted form.

For example, parts of the call hierarchy or call sequence of the function blocks in the computer program may be stored in the individual function blocks or variants. This call sequence or call hierarchy, i.e. the correct call sequence of function blocks, may alternatively also be stored in the key storage unit. The call of a module, a function block or a variant takes place based on a state value that represents a value of the call hierarchy or the call sequence. The state value preferably provides information on the next module, function block or variant being invoked. Alternatively, the state value preferably also provides information on the last module, function block or variant invoked.

The key storage unit can be locked if the key storage unit is instructed to decrypt a function block that does not correspond to the program sequence. The license for executing the computer program is thereby invalidated. An invalid call can be detected, for example, by also specifying the list of potential following decryptions during a decryption. During a decryption, it can alternatively also be specified which decryptions may or must have taken place prior to this decryption, i.e. which function block could have been processed and invoked prior to the call of this function block.

As an additional option, the decryption may also be specified such that it can be carried out regardless of its predecessors. The lists of permissible predecessors or successors are preferably handed over to the key storage unit in a cryptographically secured fashion in order to prevent any modifications by a hacker or manipulation software. This likewise ensures that the list of potential function block predecessors or successors is not visible to a hacker or malware in plain text. Consequently, manipulation software is unable to select the sequence, in which the function blocks are executed, freely and independently of the program logic and the process sequence defined in the computer program.

In a preferred embodiment of the method, the state value is processed in the secure key storage unit or stored in a storage location of the computer that may consist of the storage medium or of the key storage unit or of a dongle.

Since the key storage unit only manages and executes the decryption of the function blocks and since it is required that a function block is also executed after its decryption, the program sequence carried out during a dynamic analysis can be detected by monitoring the decryption inquiries sent to the key storage unit.

The invention is described in greater detail below with reference to special embodiments illustrated in the figures. The characteristics illustrated in these figures can be used individually or in combination in order to implement preferred embodiments of the invention. The invention as generally defined in the attached claims is not restricted to the described embodiments. In the figures:

FIGS. 4a-4f show an example of the process sequence for generating module variants.

FIG. 1 shows the general structure of the method for protecting a computer program in accordance with the Kerckhoff principle. The different measures used by the inventive program are illustrated in the form of a tree structure.

Figure 1:
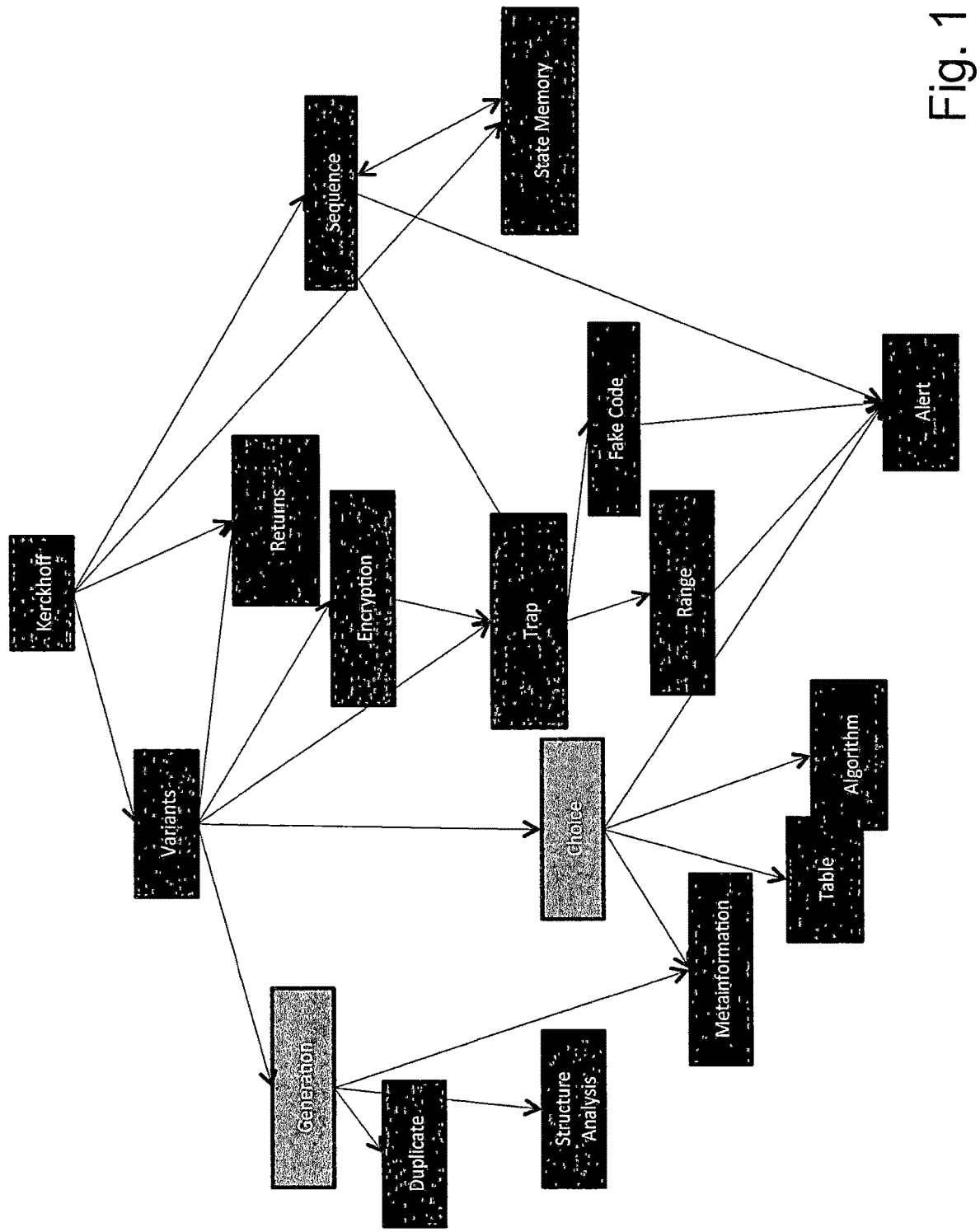
FIG. 1 shows a structural diagram of the inventive method for protecting a computer program.

The first measure to be mentioned is the generation of variants. This is subject to multiple requirements and options. The generation may be realized with the above-described options of duplicating a function block or module or of generating a variant of a function block or module based on the structure analysis. For example, different decision trees can be represented within a function block or module by a variant. Potential application scenarios in this respect are so-called individual or cascading conditions such as IF-statements. Another option for generating variants is based on the use of meta-information. This is information in addition to the computer program to be protected. For example, the execution of the program may be subject to different validity ranges, e.g. in an engine control that allows different operating modes such as an emergency mode, a warm-up phrase or a racing mode.

The individual variants are preferably selected based on the meta-information if individual ranges are specified. Another option is a table-controlled selection. The method for protecting a computer program can randomly define which input values must be used for which variant in a table. Such a table is preferably encrypted. It is particularly preferred that the table is already contained in the computer program itself.

Another option for selecting the variants consists of calculating the individual variants by means of algorithms. This may take place in the key storage unit. A static analysis, in which the program is merely analyzed without executing the actual code, is then no longer possible. The program is not executed, but rather only observed during a static analysis. The program then basically has no active defense measures. However, a static analysis is reliably prevented due to such a variant generation, as well as due to the fact that different variants are not selected until the process (program sequence) is executed. These defense measures, as well as active defense measures, require that the program is executed and therefore at least temporarily under the control of the computer system.

When using variants, the variants are preferably encrypted. The variants therefore cannot be readily analyzed, particularly with a static analysis.

Another option consists of generating variants that are used as traps. These variants are never invoked or addressed by the computer program during a proper execution thereof. If such a trap is invoked by manipulation software, a license stored, in particular, in the key storage unit or dongle can be deleted. This prevents an invasive program or manipulation software from proceeding further in the program because the required license is missing. A hacker or manipulation software therefore no longer has the option of simply starting anew after a failed attempt.

In addition to the option of using traps in the form of so-called fake code, it is also possible to carry out a range check for the state value when the variant is invoked. A trap of sorts can also be formed if variants are only permitted for certain value ranges, but it is still possible to also invoke these variants for other value ranges.

In the use of variants, as well as in the execution of the program and its function blocks, individual function blocks or variants are typically invoked by means of so-called calls. The return after the execution of the function block is realized in the form of so-called returns. Another preferred protective measure of the inventive method consists of controlling and monitoring the return. This return can only take place if the license is at hand and executed. For example, it can be calculated from certain parameters if a valid license is at hand and if a valid return can take place. It is also possible to define the point, to which the return takes place.

If the calculation is carried out by means of parameters, it is preferably checked if the value range, in which the parameters lie, has been patched. The computer program should stop the execution if this is the case.

In a preferred embodiment of the method for protecting a computer program, at least one of the calls required for invoking individual variants or functional blocks is encrypted. It is preferred that at least a few of these calls are secured in the computer program by means of encrypted "trampoline jumps." In this case, the call target is not available in plain text in the computer program. In fact, the address is encrypted. Consequently, an execution is only possible if a valid license (key) is at hand such that a static analysis is prevented. The sequence of the computer program and the call hierarchy therefore can also not be predicted and analyzed without a valid license.

In a preferred embodiment of the method and, in particular, in a further enhancement of trampoline jumps, jumps to different destinations are carried out by means of the same "trampoline" in a program-controlled fashion. As a result, jumps from many different locations in a program only take place to the one trampoline rather than to different target procedures. The trampoline now decides the actual target routine based on an additional parameter and jumps to this target routine. Consequently, a static analysis does not make it possible to deduce the routines and locations, to and from which jumps have respectively taken place. A static analysis therefore does not provide a hierarchy of procedures, but rather a flat structure, in which each procedure only references the trampoline and the trampoline references many or all target procedures (e.g. function block, module). The sequential structure for a static analysis is thereby concealed. The next target procedure or module to be invoked, to which the next jump should take place, is preferably selected in the protected key storage unit. For this purpose, the trampoline function calls the key storage unit, hands over the input parameter and ultimately receives back a selection value such that the desired and "correct" target procedure is invoked.

This embodiment merely requires a complex structure of the computer program to be protected, but not an encryption of the trampoline function or the modules or function blocks. In practical applications, all computer programs to be protected have the required complexity.

Since a hacker attempts to execute the program without the key storage unit, the information generated by the key storage unit, i.e. the selection of the modules to be invoked, is not available to the hacker. Consequently, the hacker has to ascertain this information by means of the "trial and error" approach. The greater the number of variants and modules using a trampoline function, the more elaborate this trial and error approach becomes.

Another option according to the Kerckhoff principle consists of monitoring the state memory in the key storage unit. In this case, the dongle is preferably used as state memory. The dongle or key storage unit detects the correct sequence of function blocks and/or variants. If an irregular call or an inquiry for decrypting an irregular or impermissible function block or module takes place, the program and the program sequence can be locked or changed and, if applicable, an alarm can be triggered.

Another preferred measure consists of controlling and monitoring the execution sequence and call hierarchy. In this case, the program execution and the branching to individual function blocks and/or variants have to take place in a predefined sequence. This sequence is checked and controlled during the execution.

Figure 2:
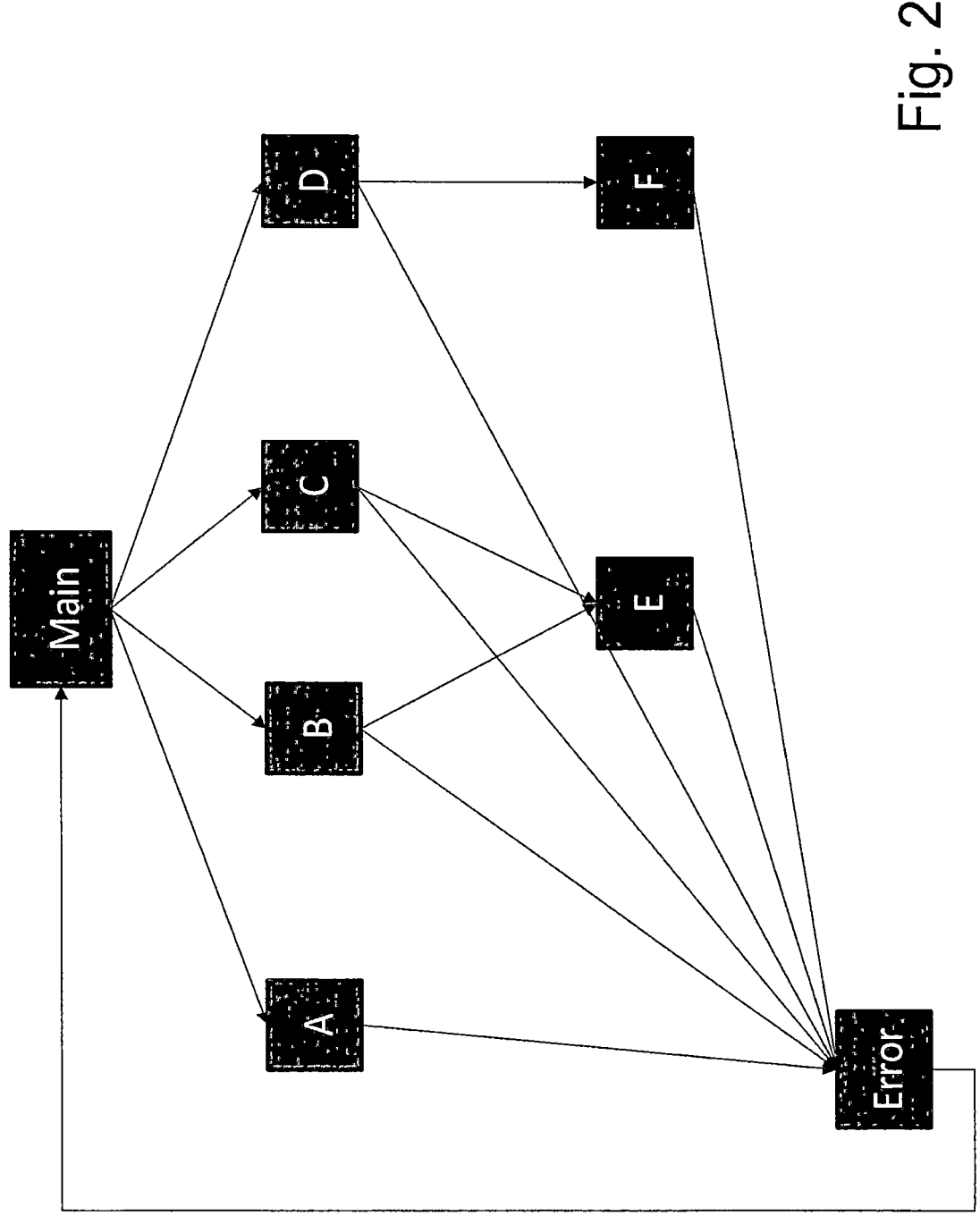
FIG. 2 shows an example of a call structure of individual modules.
Figure 3:
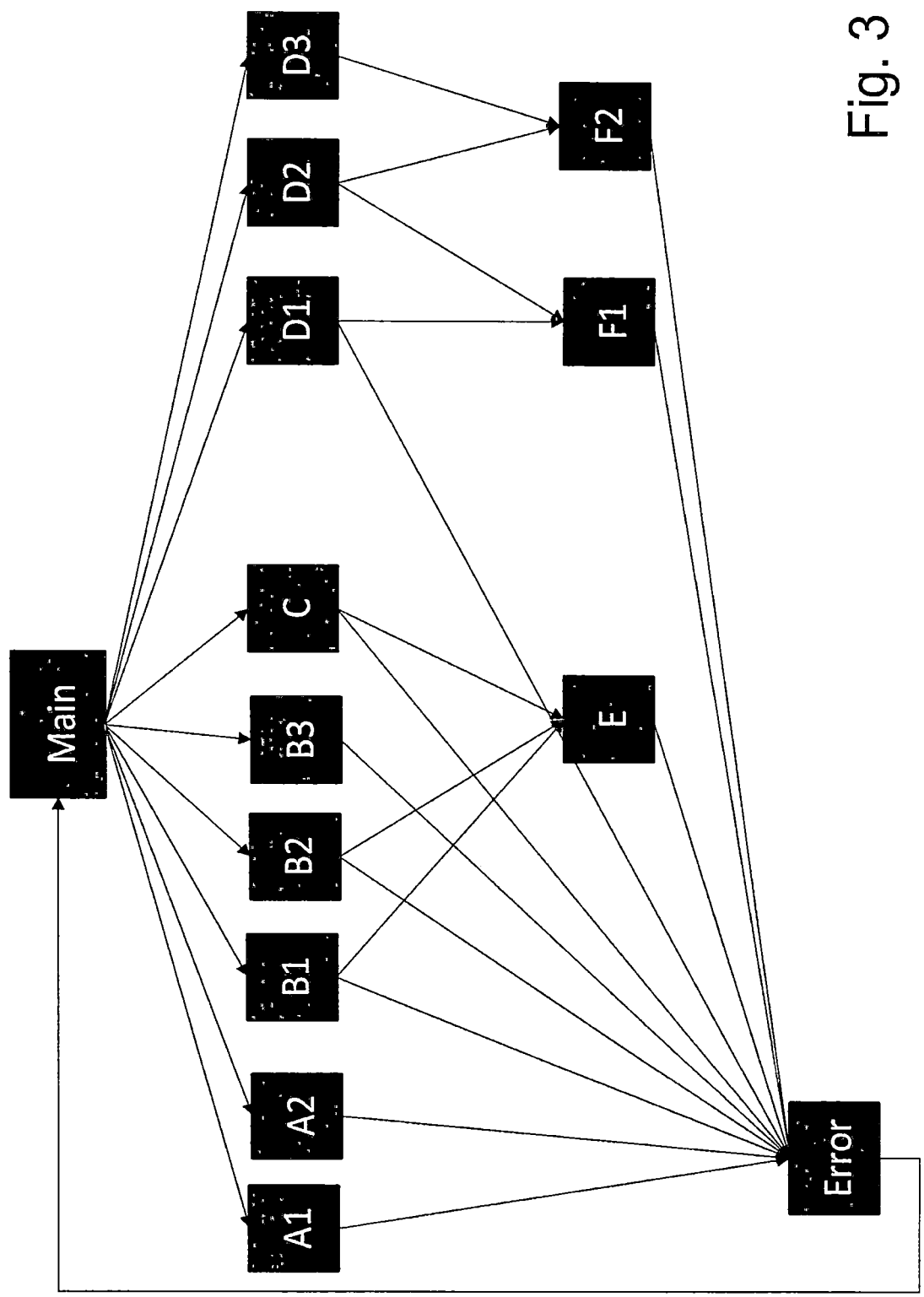
FIG. 3 shows an example of a call structure of a computer program with variants.

FIG. 2 shows the basic structure of a call hierarchy using an example with multiple function blocks whereas FIG. 3 shows a sequential control with variants.

According to FIG. 2, the main routine (main) can invoke several function blocks A to D. The function blocks B and C invoke a function block E. The function block D invokes the function block F. All function blocks can invoke an error function block for handing errors.

The inventive automated method for protecting a computer program ensures that the program code of the computer program is always invoked in a valid, predefined sequence. The execution of the sequence is preferably ensured in that this sequence is stored in a secure key storage unit such as, for example, in a dongle. The execution of the program can then only take place with a connected dongle or an available license. Since the key storage unit or dongle itself is unable to monitor the code being executed, the key storage unit preferably has to refer to monitored parts of the execution, i.e. of the process. It is particularly preferred to monitor encryption calls and inquiries for the key storage unit.

The key storage unit or dongle therefore preferably logs the decryption of the function blocks. It is assumed that a function block is executed after the decryption. If the invoked function block (e.g., E) subsequently returns to the invoking function block (caller, e.g. B), the invoking function block (e.g. B) must inform the key storage unit of the return. This may be realized by means of another decryption call for the function block to be invoked (e.g. B) to the key storage unit or by informing the key storage unit of the fact that the call hierarchy has been decreased in the form of a separate instruction. In the example according to Function 2, the call sequence could be realized as described below:

The main program invokes the function block A. This function block returns to the main program. Subsequently, the function block C is invoked and in turn invokes the function block E in a next step. The sequence then returns from the function block E to the function block C. The error routine Error is subsequently invoked. Another call from the main program could take place to the function block D, which in turn invokes the function block F. The sequence then returns from this function block to the function block D and onward to the main program.

However, an invalid sequence is detected, for example, if the function block E is invoked in an unauthorized fashion directly after invoking the main function block. The key storage unit can lock and block the further use of the license in this case.

In a preferred embodiment of the method, a static program analysis is prevented. The function blocks being invoked are usually noted in the code of computer programs. This is realized by means of so-called call instructions in the program code. The address of the function block to be invoked is contained directly in the program code. Consequently, a static program analysis is possible if it can be ascertained which function blocks are invoked by which function blocks. Manipulation software therefore can determine the program structure and the dependence of the different function blocks on one another. This is preferably prevented by encrypting the address of the calls. Consequently, even manipulation software remains in the dark as to which function blocks are invoked by which function blocks. The call hierarchy can then only be analyzed dynamically, i.e. at the time of execution.

FIG. 3 shows a call structure with different variants. The function blocks A, B, D and F are divided into diverse variants. For example, variant A1 may be invoked for state values between 0 and 10 whereas variant A2 is selected for values between 11 and 100.

In the example illustrated in FIG. 3, the function block F1 is invoked by the variants D1 and D2; the function block F2 is invoked by the variants D2 and D3. The function block E can be invoked by the variants B1, B2 and C. With the exception of the variants D2 and D3, all function blocks and variants are able to invoke the error handling function block (error).

In the structure according to FIG. 3, it is clear that the variant B3 of the function block B cannot invoke any of the function blocks E or the variants F1, F2. If a call for F1 nevertheless takes place from the variant B2, an error is detected and the process is terminated. In a preferred embodiment, it can be checked in B2 if the call for F1 is permissible.

Alternatively, it can also be checked in F1 if the call from the variant B2 is permissible.

FIGS. 4a-4f show the process sequence of part of the inventive method for protecting a computer program. In the preferred sequence shown, module variants are initially generated by means of duplication. Although the described example concerns modules, it can also be applied to any part of the code of a computer program, as well as to function blocks or other functionally associated modules.

The description is initially based on a module A, of which several identical module variants are generated by means of duplication. The module shown is arranged in the j-th level in the call structure of the program. It is supplied with the input parameter p. Such a module is designated as Aj(p) in the example shown.

Multiple duplications of the module Aj(p) results in the generation of n variants of the module that are designated as Aj1(p), Aj2(p), . . . , Ajn(p).

In the next step, the duplicated module variants Aji(p) are modified such that the individual variants only process certain value ranges $\alpha i$ and are only valid for parameters within these value ranges. In FIG. 4b, these module variants are designated as Aj1(p1), Aj2(p2), . . . , Ajn(pn).

The modified module variants are preferably encrypted as illustrated in FIG. 4c. The encrypted blocks are illustrated with a gray background.

In a preferred embodiment, so-called traps are inserted between the individual encrypted module variants or module blocks as illustrated in FIG. 4d. These traps consist of program code that is also encrypted, but never invoked and executed in the original program sequence and therefore also never decrypted. These "code traps" are also designated as a module such that the total number n of modules is increased by the total number m of code traps. In this respect, it has to be noted that the code traps may be arranged at any point between the module variants. Their indexing may also be changed.

Figure 4E:
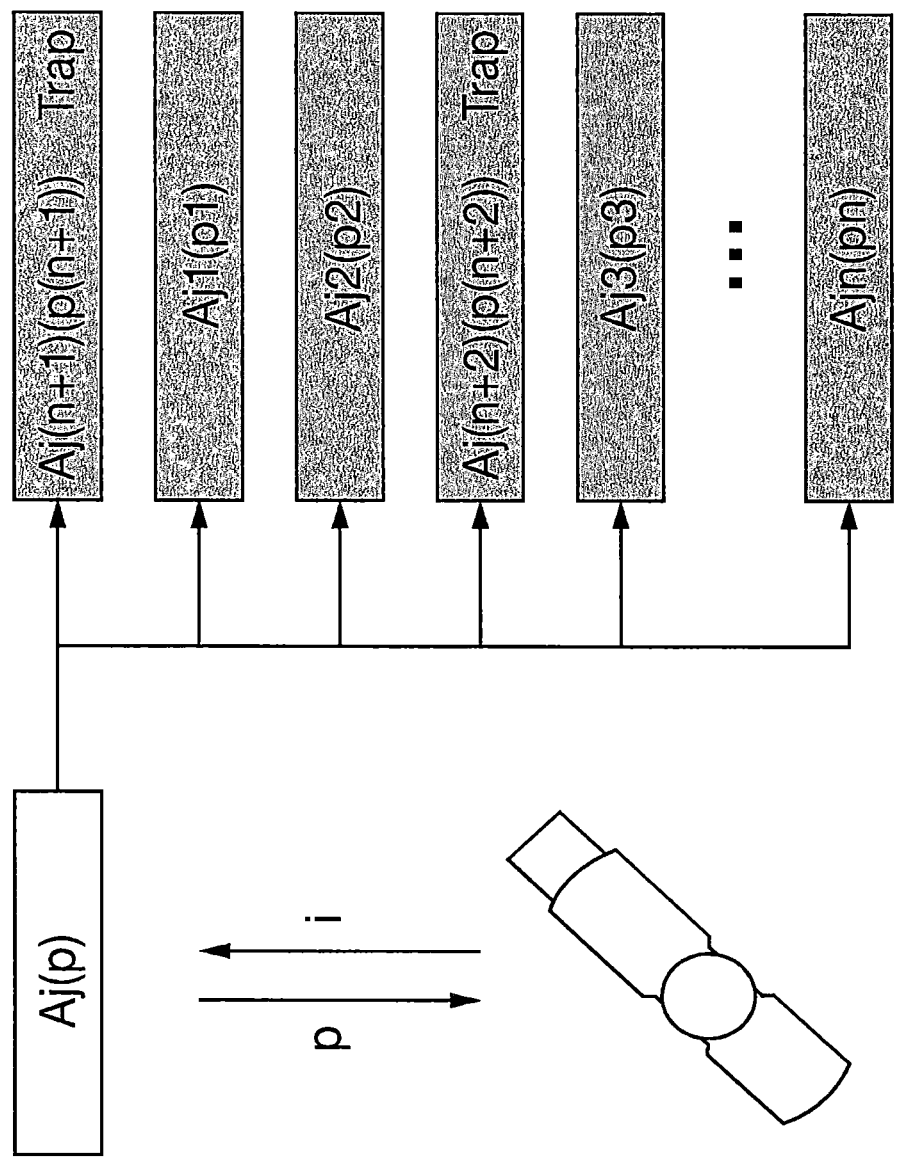

FIG. 4e shows the selection of the module variants by means of a protected key storage unit that is realized in the form of a protected and secure dongle in this case. After the redirection of the call by means of the dongle, the selection of the module variant being invoked only depends on the input parameter pi. Consequently, the selection of the corresponding module variant i is carried out in the dongle in dependence on the input parameter p. In this case, the dongle checks the input parameter and determines the module selection based on a comparison between the parameter and predefined value ranges of the individual modules. The index i describing the module is returned to the invoking function. For this purpose, the dongle (key storage unit) preferably comprises a selection algorithm that is executed, in particular, in a processor of the dongle.

Figure 4F:
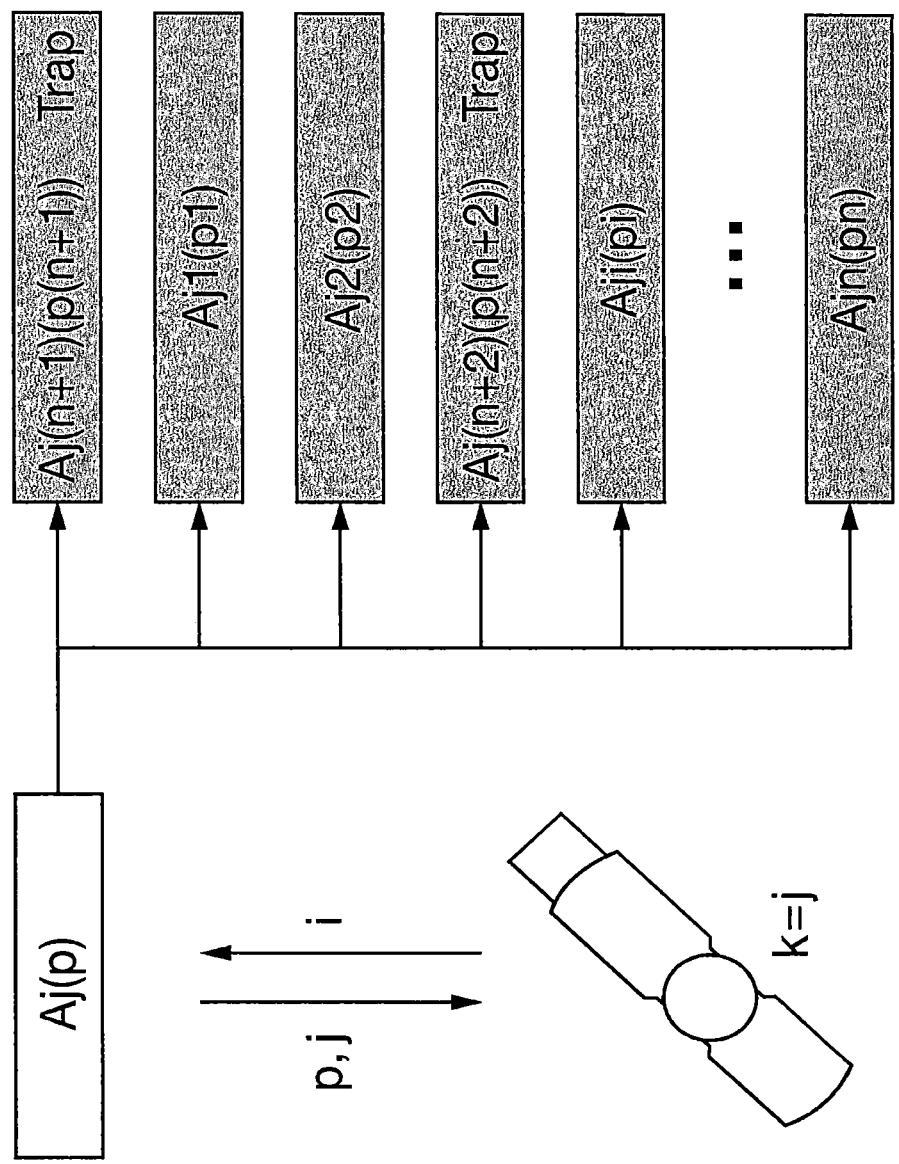

A preferred variation of the method is described below with reference to FIG. 4f, in which another algorithm (state algorithm) is additionally executed in the key storage unit such that the key storage unit functions as a state memory. In this case, not only the parameter p is handed over to the key storage unit, but also a hierarchy value j. The key storage unit then selects the i-th module variant in dependence on the input parameter p in the above-described fashion. It is also checked if the structural hierarchy of the module and the module variant correspond. On the one hand, the input parameter and the hierarchy value j can be interrelated. On the other hand, it is also possible to check from which preceding module or code segment the call takes place and/or in which structural hierarchy the invoked code segment is arranged. This makes it possible to carry out a second check that additionally complicates manipulations and changes of the protected computer program by a hacker attempting to completely bypass the key storage unit.

Figure 5:
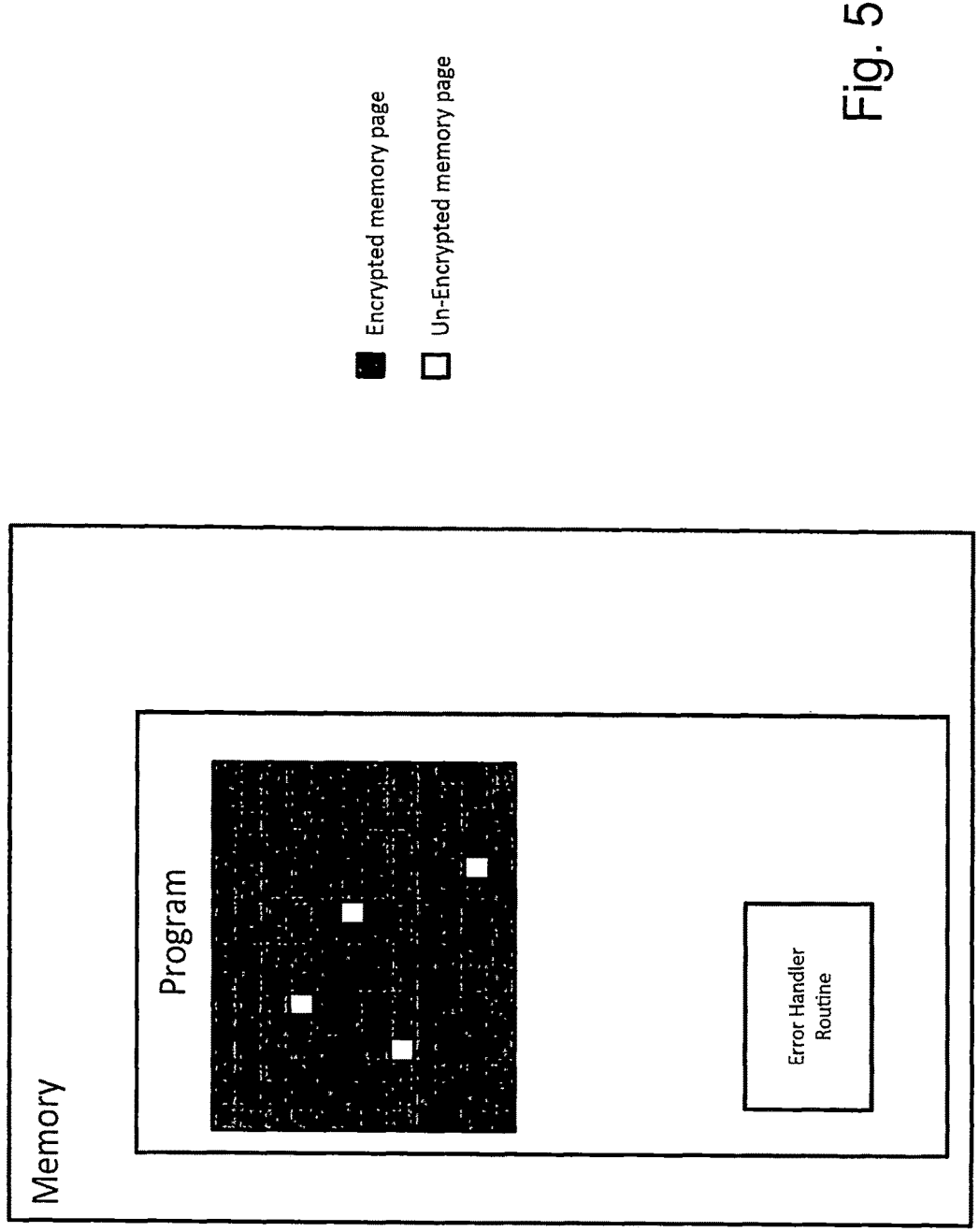
FIG. 5 shows a basic diagram of a computer program loaded in the main memory.

FIG. 5 shows a so-called Guard Page application. This figure shows the main memory (memory) of the computer system, in which the computer program (program) is loaded. In this case, the main memory is physically divided into individual areas or so-called pages or tiles that may be encrypted.

This division is a result of the physical construction of the computer. Pages have a typical size of 4 KB (4096 bytes). The computer can only modify the protection characteristics of the memory based on these pages. This realization is utilized by the inventive method.

A page can assume one of the following states:
no access
read access only
read and write access,
read access and authorization for code execution
read access and write access, as well as authorization for code execution.

A protection fault is triggered if the computer program protected by the inventive method requests access that is not covered by these authorizations at the time of execution. One common example of this is a "Null Pointer Exception." If such a protection fault is triggered, the program has the option of handling this exception itself by invoking a handling routine for memory errors (error handling routine), which the program previously registered with the operating system.

In the context of the invention, it was recognized and implemented that this mechanism can be used as a protection mechanism for protecting programs from being attacked in the form of a memory dump (dump) during their runtime. For this purpose, individual pages are encrypted and the authorization to access these pages is subsequently set to "no access." A protection fault is triggered if the computer program protected by the inventive method accesses this page during the course of its execution.

The page is now automatically decrypted during the course of the handling routine and the access authorizations are reset to the original values. The execution of the program can now continue. In order to prevent all pages of the program from being decrypted over the course of time, the program can once again encrypt the pages in a time-controlled fashion and set the access protection back to "no access."

The automated method for protecting a computer program therefore ensures that a hacker or an invasive program reading out the memory from an external process cannot read the memory in plain text. If the invasive program changes the memory protection, it can in fact read the memory, but the memory only contains encrypted data.

With respect to protected computer programs, a standard attack strategy for invasive programs consists of executing the program and performing a memory dump during the execution. This dump (memory dump) contains the part of the main memory, in which the program was loaded. In another step, the invasive program or the hacker attempts to regenerate an executable data file from the dump.

However, a dump usually only contains the parts of the memory that directly originate from the executable data file. A memory (e.g. of a so-called heap) requested by the program during its runtime is not contained in the dump. If protected parts of the program are not executed in their normal position in the main memory, but rather in a different position (e.g. heap), these program parts are not contained in the dump such that the hacker is confronted with new challenges. This realization is utilized by the inventive method.

However, this approach is associated with the technical problem that during the translation of the source code machine code is generated that also refers to other code or data in the respective computer program. For example, this machine code consists of addresses of global variables, addresses of procedures or addresses, at which the reference to operating system functions are stored (IAT—Import Address Table). Depending on the machine architecture, the addresses are either stored in the process environment relative to the respective execution address or in the form of absolute addresses.

If the executable code of a procedure of a computer program protected by the inventive method is shifted to a different address, absolute addresses in fact remain valid, but addresses relative to other methods or function blocks are thereby invalidated.

The inventive method preferably comprises this protection mechanism, which is referred to as "Out Of Place Execution." For this purpose, the program to be executed is preferably analyzed and at least the relative addresses are identified in order to correct these addresses during the runtime of the protected computer program in such a manner that the program remains executable.

The result is a computer program, which does not execute individual procedures and functional blocks at the location at which they were stored by the compiler, but rather at changing addresses in the main memory of the computer system. Either no code at all or only encrypted code is located at the address, at which a procedure (code) was stored by the compiler. If multiple procedures are handled in this manner, they can be stored at the same location in the main memory at different times. This makes it even more complicated for a hacker or manipulation software to identify which procedure needs to be assigned to which code.

Static analyses, as well as dynamic analyses, by a hacker or manipulation software are prevented due to the measures taken in accordance with the inventive method. For example, one competent measure is the use of variants for individual function blocks or modules. In the context of the invention, it was recognized that it is possible to make the following assumption, on which the principle of the inventive method is based:

Even with information on p−1 variants of a function block F, a hacker or manipulation software is unable to determine other variants of the function block by means of reconstruction.

This assumption is based on the realization that a hacker or manipulation software requires detailed information on the function blocks and the algorithms used therein in order to change a variant of a function block. If a hacker is successful in understanding the algorithms and their interaction in the program in such detail, the hacker also could personally write such a computer program and would not have to hack an existing program.

Due to the above-described assumption, a simulation-based security term makes it possible to formally demonstrate that a hacker, who may carry out one of these attacks, does not gain any additional information at all. Except for the execution of trivial attacks or very elaborate attacks that, however, are not efficient and economically feasible, a hacker carrying out a dynamic analysis can thereby be reduced to a static hacker.

In the context of the invention, it was recognized that the correctness of the inventive protection method can be easily verified. Since the method changes the code of the computer program, for example by generating variants, it is possible and important to demonstrate that these changes do not change the function of the computer program to be protected. The correctness of the method can be verified by verifying the correctness of the modification of the variants. If each elementary modification is correct, then any links between these modifications are also correct. This is undoubtedly the case in the present instance.

The protection method for protecting computer software referred to as Blurry-Box method makes it possible to provide protection in accordance with the Kerckhoff principle. In comparison with other software protection methods, the security of which is based on the secrecy of the entire process, the Blurry-Box method focuses on keeping the complexity of the application secret. Consequently, the Blurry-Box method is based on keeping the cryptographic keys used in the method and the complex interrelationship of the program structure secret. However, the method itself, as well as the protected program, can be disclosed. This provides multiple advantages.

- It is much easier to keep relatively short keys secret than a complete method and a protection implementation.
- The protection by keeping a method secret is dubious because a method can be reconstructed by means of reverse engineering. This risk is eliminated in the inventive method.
- It is easier to replace compromised keys than compromised methods. If a method, the security of which is based on secrecy, is made public, this represents a global breach of the method for all licenses and keys. However, if a secret key becomes public, the breach is locally limited to one license. Other computer programs secured with a different key therefore cannot be executed.
- The security of the method can be publicly discussed and analyzed by independent experts. The effort required for hacking the method can therefore be quantified. In contrast to previous methods, software manufacturers can make a qualified decision as to whether or not the protection is worthwhile.

This realization forms the basis of the present invention, which for the first time utilizes the Kerckhoff principle for the protection of computer programs. Until now, encrypting and keeping the entire protection method secret was considered highly advantageous by relevant experts. A disclosure of the protection method was adamantly opposed because this was considered as a significant weak point. The experts assumed that keeping only keys and encrypted parts of the method and of the software to be protected secret is disadvantageous and that this approach is easier to bypass with an invasive program or manipulation software.

The invention claimed is:

1. A method for protecting from invasive or manipulative programs a computer program in a form executable on a computer system that comprises a processor for executing the computer program and a main memory for storing the computer program's code for execution, the method comprising:

selecting at least one of a plurality of parts of the computer program to be encrypted in an executable version of the computer program, the at least one part of the computer program requiring at least one key for decrypting the encrypted part for execution, the at least one key to be stored in a protected key storage unit accessible to the computer program during execution;

selecting at least one of the plurality of parts of the computer program for duplication; and, for each of the plurality of parts of the computer program selected for duplication:

generating a plurality of variants by creating duplicates of the selected part and modifying at least one of the duplicates, the plurality of variants replacing the selected part of the computer program in the executable version of the computer program; and selecting which of the plurality of variants will be executed during execution of the executable version of the computer program based on a predetermined control flow of the computer program.

2. The method according claim 1, wherein the computer program is comprised of a plurality of modules, and the at least one part of the protected computer program that is duplicated is one of the plurality of modules, the method further comprising the following steps:

determining at least one specific state value for the computer program that will be processed in at least one of the plurality of modules when loaded into the main memory while the computer program is being executed by the processor, and checking the validity of the processed state value in regard to the at least one of the plurality of modules, wherein an invalid state value causes a change in a program sequence of the computer program.

3. The method according to claim 1, wherein the computer program is comprised of a plurality of modules, and one of the at least one part of the protected computer program that is duplicated is one of the plurality of modules; the method comprising:

defining a value range for at least one input parameter required for the execution of each of the plurality of variants, encrypting the plurality of variants, redirecting a module call to the one of the plurality of modules with a value for the at least one input parameter to the key storage unit, the key storage unit checking the value of the at least one parameter against the value range to verify whether the module call is authorized, and in response to verification returning a selection parameter for indicating selection of one of the plurality of variants of the one of the plurality of modules for handling the call.

4. The method according to claim 1, wherein each of the parts of the protected computer program selected for duplication comprises one of a module and a function block, the module comprising one or more function blocks, for each of the at least one part of the protected computer program selected for duplication, at least one function block or module is replaced with the plurality of variants, and the plurality of variants are generated after the computer program to be protected has been compiled.

5. The method according to claim 4, wherein generating the plurality of variants comprises duplicating the selected parts of the computer program based on a structure analysis of the program prior to duplication or on meta-information on the computer program.

6. The method according to claim 4, wherein the computer program selects and executes one of the plurality of variants in dependence on a call parameter that is a state value, wherein the key storage unit checks that the state value corresponds to the invoked variant.

7. The method according to claim 4, wherein one of the plurality of variants has been modified to have a certain value range for a state value is defined in the variant and the state value must lie within the defined value range when the variant is invoked in order to detect a valid call and to perform an execution.

8. The method according to claim 4, wherein at least one of the plurality of variants is encrypted, and wherein the key required for the decryption is stored in the secure key storage unit.

9. The method according to claim 4, wherein the plurality of variants are generated based on the structure of the module or function block that is replaced by the plurality of variants.

10. The method according to claim 4, wherein selection of one of the plurality variants to be invoked is based on predefined values or determined algorithmically or determined from the state values of a process or determined in the key storage unit.

11. The method according to claim 2, wherein the state value is a value that refers to a process state and it is checked that the state value lies within a valid, predefined validity range.

12. The method according to claim 1, wherein the computer program comprises at least one module having at least one function block, and wherein at least one of the at least one module, the at least one function block, and the plurality of variants, and, when invoked or executed, leads to one or more of a process termination, locking of the key storage unit and/or deletion of the at least one key stored in the protected key storage unit.

13. The method according to claim 1, wherein a call to one of the plurality of variants takes place based on a state value that represents a call hierarchy or a call sequence.

14. The method according to claim 1 wherein the protected key storage unit is comprised of at least one of following: the storage medium of the computer, a protected area of the storage medium of the computer, and a dongle that communicates with the computer via an interface.

15. The method according to claim 2, further comprising: processing the state value in the secure key storage unit or storing the state value in a storage location of the computer.

16. The method according to claim 1, wherein detection of an attempt to manipulate the protected computer program with manipulation software or an intrusion by means of an invasive program causes a change to the secure key storage unit or an alarm.

17. A computer system comprising
a processor,
a storage medium,
at least one main memory,
an executable version of a computer program stored on the computer system, and
a protected key storage unit that is accessible to the computer program when executed;
wherein the computer system protects the computer program from being influenced by an invasive program or software for manipulating computer programs;
wherein,
the computer program is comprised of a plurality of parts;
at least one of the plurality of parts of the executable version of the computer program is encrypted and requires at least one key for decryption during execution, the at least one key being stored in the protected key storage unit; and
one or more of the plurality of parts of the computer program has been duplicated in the executable version of the computer program, wherein each duplicated part of the computer program has been replaced in the executable version of the computer program with a plurality of variants of the duplicated part of the computer program created by duplicating and modifying at least one of the duplicates; and
wherein, during execution of the executable version of the computer program, selection of which of the plurality of variants to execute is based on a predetermined control flow of the computer program.

18. The method according to claim 9, wherein the plurality of variants represent different decision trees within the duplicated module or function block.

19. The method according to claim 10, wherein the predefined values used for selecting one of the variants during execution are stored in a table.

20. The method according to claim 10, wherein the selection of the variant is calculated while the process is executed.

21. The method according to claim 13, wherein the state value provides information on the next module or variant being invoked.

22. The method according to claim 13, characterized in that the state value provides information on the last module or variant being invoked.

23. The computer system according to claim 17 characterized in that the system having an interface for connecting the key storage unit or dongle.

24. A method for protecting a computer program from being influenced by an invasive program or by manipulation software for manipulating computer programs on a computer system comprising a processor, a main memory, a storage medium and an interface, wherein parts of the protected computer program are encrypted and are decrypted during execution by at least one key stored in a protected key storage unit and wherein parts of the computer program comprise modules; the method comprising:
selecting at least one module to be provided multiple times according to a control flow of the protected computer program;
duplicating each of the selected modules into duplicate modules according to the control flow of the protected computer program, whereby parts of the protected computer program are provided multiple times in the program code of the protected computer program;
modifying at least one of the duplicate modules for each of the selected modules to create a plurality of variants;
defining a respective value range for at least one input parameter required for the execution of the at least one of the selected modules; and
encrypting the plurality of variants for the at least one selected module;
wherein the protected computer program, when executed, redirects to the protected key storage unit a module call with at least one parameter to the at least one selected module, handing over the at least one input parameter to the protected key storage unit for checking the input parameter against the value range defined for the at least one selected module and receives from the key storage unit a selection parameter i for selecting the i-th variant of the plurality of variants of the at least one selected module after the key storage unit checks and verifies authorization of the module call in the key storage unit based on the input parameter.

25. The method according to claim 24, wherein the protected computer,
receives the selection parameter i from the key storage unit;
selects the i-th variant;
hands over the selected i-th variant together with the input parameter of the i-th module to the key storage unit for decryption and execution by the i-th variant in the key storage unit; and
receives from the key storage unit a result value for further processing.

26. A method for protecting a computer program from being influenced by an invasive program or by manipulation software for manipulating computer programs on a computer system comprising a processor, a main memory, a storage medium and an interface; wherein the computer program is logically comprised of a plurality of modules; the method comprising:
selecting at least one of the modules for protection based on the computer program's inherent complexity;
encrypting at least part of the computer program and the at least one module of the computer program;
storing at least one key for decrypting the at least one module in a protected key storage unit;
generating or identifying at least one specific logical state value specific for the computer program that is processed based on the control flow of the program in the at least one module loaded into the main memory while the computer program is executed by the processor in the main memory of the computer system;
wherein,
the specific logical state value is an internal logical value of the computer program based on the inherent complexity of the program's structure and with information on one or more of the computer program's sequence, purpose and use, and is characteristic for the process being executed in the main memory of the computer system; and
the protected computer program checks the protected key storage unit for the validity of the processed logical state value in regard to the at least one module when it is being executed, wherein an invalid logical state value causes a change in the program sequence of the computer program.

27. A method for protecting an executable computer program against an invasive program or software for manipulating computer programs when running on a computer system that comprises a processor, a main memory, a storage medium, the method comprising:
selecting at least one part of the computer program to be protected by encryption, the at least one part of the computer program requiring a key for decrypting the encrypted part for execution, the key to be stored in a protected key storage unit;
selecting at least one part of the protected computer program for duplication;
creating a plurality of variants for each duplicated part of the program by creating duplicates and modifying at least one of the duplicates, and replacing the duplicated part of the computer program with the plurality of variants; and
selecting which of the plurality of variants to execute based on a predetermined control flow of the program;

wherein,
the selecting of at least one part of the protected computer program for duplication is according to meta-information, and
the creating a plurality of variants in the protected computer program's code is based on the selection of the parts of the computer program code according to the meta-information.

28. A method for protecting an executable computer program from invasive or manipulative programs when running on a computer system that comprises a processor, a main memory, and a storage medium, the method comprising:
selecting at least one part of the computer program to be protected by encryption, the at least one part of the computer program requiring a key for decrypting the encrypted part for execution, the key to be stored in a protected key storage unit;
selecting at least one part of the protected computer program for duplication;
creating a plurality of variants for each duplicated part of the program and replacing the duplicated part with the plurality of variants; and
selecting which of the plurality of variants to execute based on a predetermined control flow of the program;
wherein creating a plurality of variants in the protected computer program's code is based on the selection of the parts of the computer program code according to the program's inherent complexity and sequence, and
wherein the created variants in the protected computer program's code corresponding to the respective selected parts of the protected computer program's code.

29. A method for protecting an executable computer program from invasive or manipulative programs when running on a computer system that comprises a processor, a main memory, and a storage medium, the method comprising:
selecting at least one part of the computer program to be protected by encryption, the at least one part of the computer program requiring a key for decrypting the encrypted part for execution, the key to be stored in a protected key storage unit;
selecting at least one part of the protected computer program for duplication;
creating a plurality of variants for each duplicated part of the program and replacing the duplicated part with the plurality of variants; and
selecting which of the plurality of variants to execute based on a predetermined control flow of the program;
wherein the selecting of at least one part of the protected computer program for duplication is based on the purpose of the program and on the use of the program, and
the creating a plurality of variants in the protected computer program's code is based on the selection of the parts of the computer program code according to the computer program's purpose and use.

30. The method of claim 1 wherein the executable computer program is capable of being read, but not decrypted, when stored in a storage medium or in the main memory of a computer system by an invasive program or manipulation software without the at least one key.

31. The method of claim 24 wherein the executable computer program is capable of being read, but not decrypted, when stored in a storage medium or in the main memory of a computer system by an invasive program or manipulation software without the at least one key.

32. The method of claim 27 wherein the executable computer program is capable of being read, but not decrypted, when stored in a storage medium or in the main memory of a computer system by an invasive program or manipulation software without the at least one key.

33. The method of claim 28 wherein the executable computer program is capable of being read, but not decrypted, when stored in a storage medium or in the main memory of a computer system by an invasive program or manipulation software without the at least one key.

34. The method of claim 29 wherein the executable computer program is capable of being read, but not decrypted, when stored in a storage medium or in the main memory of a computer system by an invasive program or manipulation software without the at least one key.

35. The method of claim 1 wherein at least one of the plurality of variants replacing the at least one part of the computer program in the executable version of the computer program is encrypted in the executable version of the computer program.

\* \* \* \* \*